Jan. 17, 1961
E. B. HILKER ET AL
2,968,283
FORCE BALANCE SYSTEM
Filed Nov. 19, 1958
3 Sheets-Sheet 1
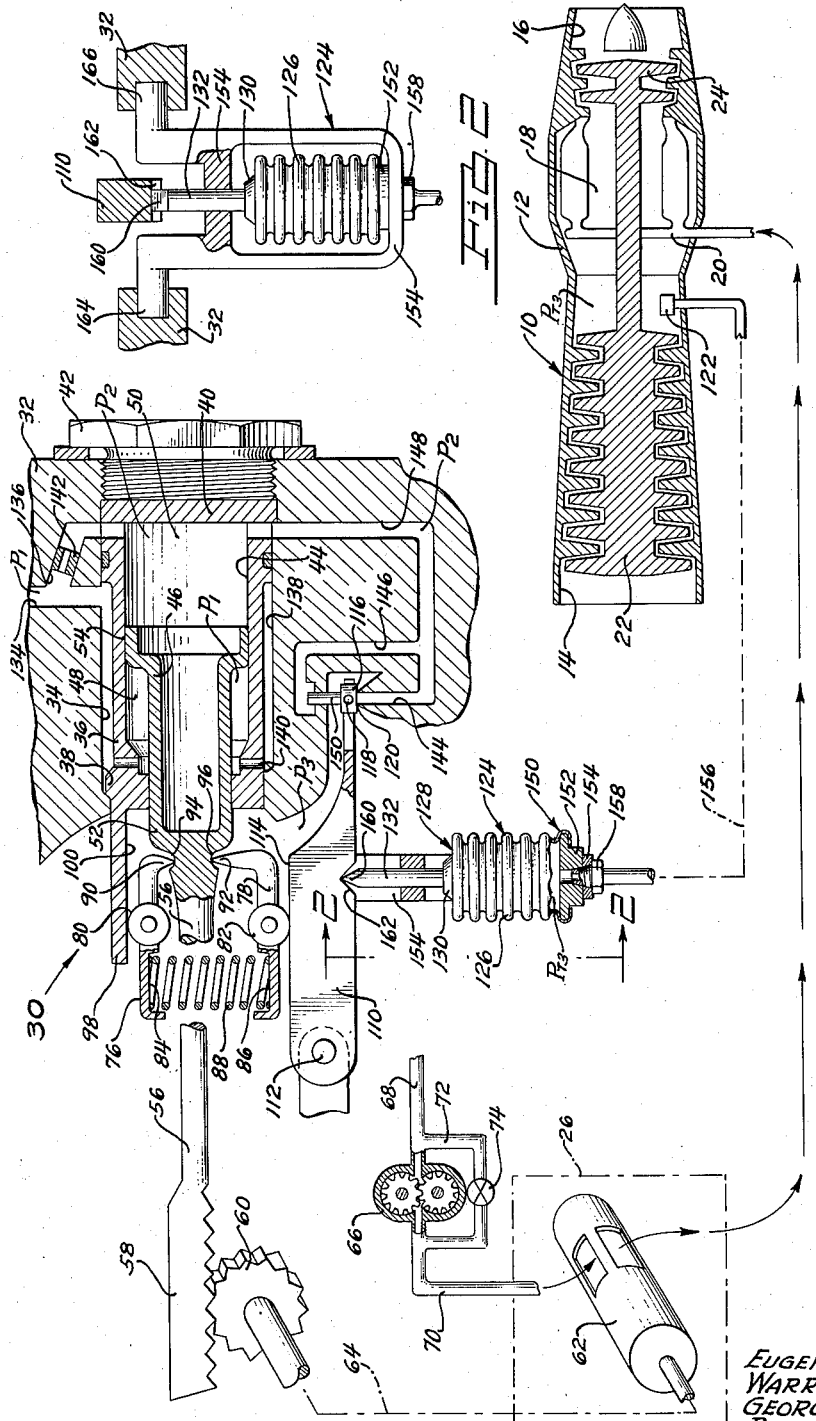
INVENTORS
EUGENE B. HILKER,
WARREN H. COWLES,
GEORGE B. STROH &
ROBERT S. FLEMING.
BY Walter Potoroha, Sr.
ATTORNEY

LEGEND

$F_N$ = FORCE INPUT FROM BELLOWS 124
$L_N$ = FIXED LEVER ARM OF $F_N$
$F_S$ = FORCE OF SPRING 88
$L_S$ = VARIABLE LEVER ARM OF $F_S$

INVENTORS
EUGENE B. HILKER,
WARREN H. COWLES,
BY GEORGE B. STROH &
ROBERT S. FLEMING.
Walter Patonuha, Jr.
ATTORNEY

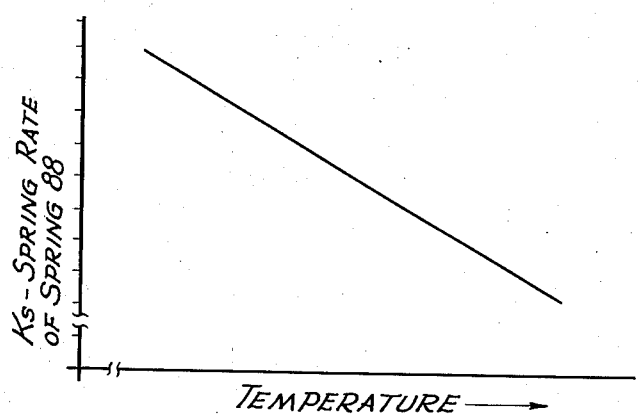
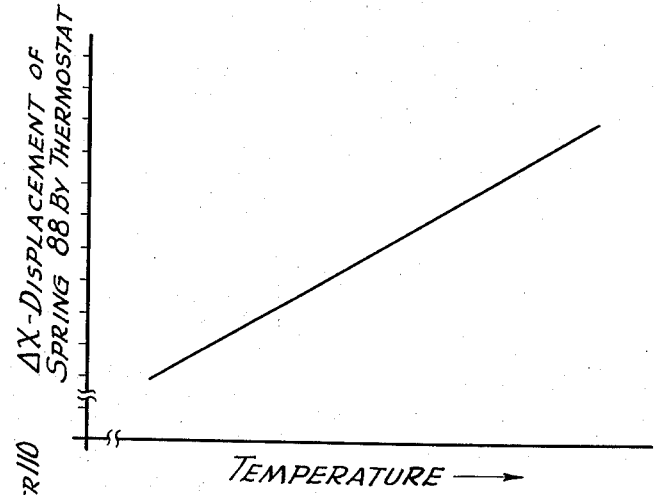
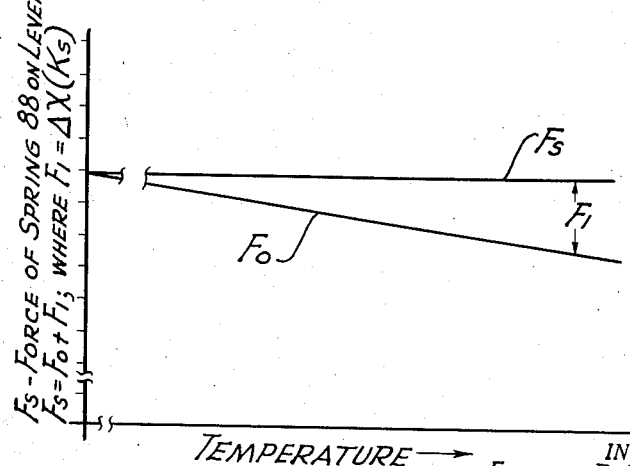

even Patent Office
2,968,283
Patented Jan. 17, 1961

2,968,283

FORCE BALANCE SYSTEM

Eugene B. Hilker and Warren H. Cowles, Detroit, George B. Stroh, Grosse Pointe Woods, and Robert S. Fleming, Detroit, Mich., assignors to Holley Carburetor Company, Van Dyke, Mich., a corporation of Michigan Filed Nov. 19, 1958, Ser. No. 774,936

10 Claims. (Cl. 121—41)

This invention relates generally to turbine engine fuel controls, and more specifically to the means employed therein for sensing various parameters on which the rate of fuel flow depends.

It is well known that parameters of speed, temperature and pressure are used independently and/or collectively for controlling and determining the operation of gas turbine power plants, and various hydraulic mechanisms have been designed to sense the magnitudes of these parameters and react in an appropriate manner to correct the fuel flow accordingly. However, these mechanisms have not proved to be entirely satisfactory because of inaccuracies at small force inputs due to the shift in servo operating points, inaccuracies arising from changes in fuel temperatures, complicated "feed-back" cam arrangements, errors due to unbalanced servo hydraulic forces and, lastly, the necessity of maintaining a constant operating pressure differential.

It is now proposed to provide a force-balance system which will produce an output displacement as a function of a force input. The general objective of the invention is to greatly minimize, if not completely eliminate the various undesirable conditions previously mentioned.

Other more specific objects and advantages will become apparent when reference is made to the following specification and illustrations wherein:

Figure 1 is a view, partially in fragmentary cross-section and partially in schematic form, illustrating the invention and its relationship to a gas turbine power plant.

Figure 2 is a view, partially in cross-section, taken on the plane of line 2—2 of Figure 1 and looking in the direction of the arrows.

Figures 6, 7 and 8 are graphs illustrating the effect of temperature on spring rate, deflection due to change in temperature and effective spring force.

Figure 3:
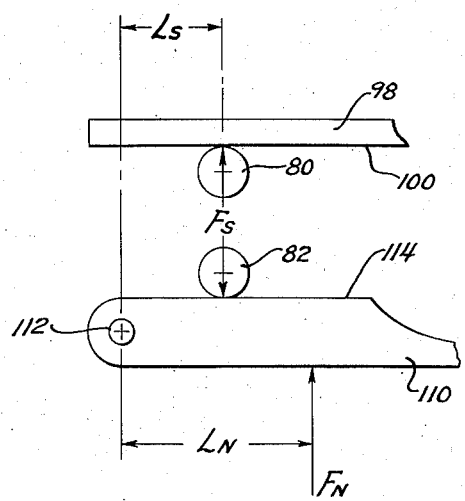
Figure 3 is a schematic illustration of the forces involved in the operation of the invention.

Referring now in greater detail to the drawings, Figure 1 illustrates a gas turbine power plant 10 having an outer housing 12 with an air intake 14 and an exhaust nozzle 16. A combustion chamber 18, having a fuel distribution ring 20 therein is located within the housing 12 between the compressor 22 and the turbine 24.

The force-balance system 30 and the fragmentary portion surrounding it may, in reality, be considered as an integral portion of the entire fuel control indicated schematically at 26. The device 30 is shown in enlarged cross-section for purposes of clarity, while the fuel control, not forming any part of the invention, is illustrated only schematically in order to show one possible use for the output of the device 30.

As illustrated, the device 30 is contained generally by the housing 32 of the fuel control 26. A cylindrical cavity 34 formed within housing 32 contains a sleeve member 36 which is held stationary with respect to the housing 32, as by shoulder portions 38, spacer 40 and threaded stop member 42. A generally cylindrical chamber 44 formed internally of sleeve member 36 contains a piston 46 which, in effect, divides the chamber 44 into two distinct and variable chambers 48 and 50.

The sleeve member 36 slideably receives the piston 46 at one end thereof so as to allow the piston to respond to variations in pressures which exist in both chambers 48 and 50. The piston 46 has two different effective diameters, 52 and 54, which in turn provide different projected areas exposed to different pressures. The proposed structure employs a hydraulic system in order to provide these different pressures; however, it is conceivable that the pressures could also be supplied through a pneumatic system.

The piston 46 is provided with an extended portion 56 of reduced cross-sectional area, which may have a rack 58 formed thereon. The rack 58 cooperates with a gear 60 to move a fuel control valve 62, as by a suitable transmission line or connection 64, whenever the piston 46 moves in response to some input signal, the input signal in this case being a pressure sense. A fuel supply system comprised generally of a pump 66, supply conduits 68 and 70, and a fuel bypass having return conduit 72 and a bypass valve 74 therein normally delivers fuel to the fuel control valve 62. The control valve 62 then meters the correct fuel flow for the particular engine operating requirements as dictated by the various parameters. The present disclosure illustrates as an example the rotational positioning of the fuel valve with respect to compressor discharge pressure.

Arm members 76 and 78, having straddling rollers 80 and 82 mounted thereon intermediate of their ends, provide at one end thereof oppositely disposed spring pads 84 and 86 for spring 88. The other ends 90 and 92 of members 76 and 78 are pivotally received by cooperating indentations 94 and 96 formed on the extended portion 56. A rigid projection 98, having a surface 100 which is parallel to the movement of piston 46, is provided for roller 80. In contrast to this, roller 82 rides on surface 114 of an arm 110 which is pivotally mounted at 112. The free end of member 110, which may be bifurcated, receives a poppet valve 116 by means of a cross pin 118, thereby allowing continual angular adjustment between valve 116 and the cooperating seat 120.

The housing 32 also provides suitable conduitry for communication of the various hydraulic or pneumatic pressures. Conduit 134 communicates with and delivers a high pressure $P_1$ to a branch conduit 136 and to the annular chamber 138 formed generally by chamber 34 and sleeve member 36. The pressure is then further communicated to chamber 48 by means of radially formed conduits 140, and to chamber 50 by means of conduit 136 having restriction 142. The pressure in conduits 144 and 146 is derived from chamber 50 by means of a common conduit 148. One end of pin 150, which is slideably retained by housing 32, is exposed to the pressure within conduit 146 while the other end continually bears against valve 116, thereby balancing the valve with respect to any pressure differentials which might exist.

Pressure $P_1$ of course exists as discussed above in all of the various passages and cavities when there is no flow through the system by virtue of valve 116 being seated. However, if valve 116 should move to some open position, flow will occur and chamber 50 and conduits 148, 144 and 146 will have some lesser pressure $P_2$ due to the pressure drop across the restriction 142 in conduit 136. Pressure $P_2$ is of course greater than the sink or reference pressure $P_3$ which exists internally of the housing 32.

The input signal or force to the force-balance system is derived from a pressure probe 122 located posterior to the compressor so as to sense compressor discharge pressure, which transmits a pressure to the bellows assembly 124. The bellows assembly 124 is substantially comprised of bellows convolutions 126 having one free end 128, which includes an end piece 130 and a guided force transmitting member 132. The other end 150 of the convolutions is rigidly secured to the housing 32 by means of an end piece 152 and frame member 154. One end of conduit 156, which may be flexible, is received by the end piece 152 as by a threaded coupling 158, while the other end of the conduit communicates with the pressure probe 122. The free end of member 132 is preferably formed so as to provide a knife edge 160 which is received by a cooperating indentation 162 formed within member 110.

Figure 2 better illustrates one possible method of securing the bellows assembly 124 to the housing 32. A frame 154 containing the bellows 126 is provided with laterally extending pivot portions 164 and 166 which may be pivotally received within the housing 32. This will enable the entire assembly 124 to be rotated about the portions 164 and 166 in a manner so as to change the force component through the member 110. Of course, any suitable means can be provided to secure the assembly in any desired position.

Operation

For purposes of illustration, let it first be assumed that the engine is running at some particular speed and that all of the details are in the positions shown. As the engine is accelerated, the compressor discharge pressure, $Pt_3$ increases and is communicated to bellows 126 by means of probe 122 and conduit 156. As $Pt_3$ increases, the bellows tends to expand, causing member 132 to create a force against lever 110 which is counterclockwise with reference to pivot 112. As lever 110 is thusly rotated, valve 116 is raised off its coacting seat 120 allowing the pressure within chamber 50 to go to $P_2$ which may closely approach the value of $P_3$. At this time pressure $P_1$ which still exists in chamber 48 causes the piston to move to the right, thereby moving the rollers to a new position on projection 98 and lever 110. When the piston 46 moves to a position whereby the lever arm of the spring force transmitted through roller 82 becomes sufficient to overcome that of the reverse force transmitted through the member 132, the entire force-balance system is once again put in equilibrium and the valve 116 is returned to its null position. Of course, as piston 46 moves either to the left or right, the rack 58 adjusts the fuel flow by positioning the fuel control valve 62.

Figure 3 illustrates schematically the forces which are involved within the force-balance system. It becomes apparent on closer inspection that when the system is in equilibrium:

(1)  $(Fs) \times (Ls) = (Fn) \times (Ln)$ (2)  And $Fs =$ some constant $K_1$ (3)  While $Ln =$ some constant $K_2$ (4)  Substituting 2 and 3 into 1, $(K_1) \times (Ls) = (Fn) \times (K_2)$ or $Ls = Fn\left(\dfrac{K_2}{K_1}\right)$ (5)  Since $\dfrac{K_2}{K_1} =$ some constant $K_3$ (6)  Then $Ls = Fn(K_3)$ From this, it is evident that the movement of the piston 46 will be linear with respect to the input force.

Figure 4:
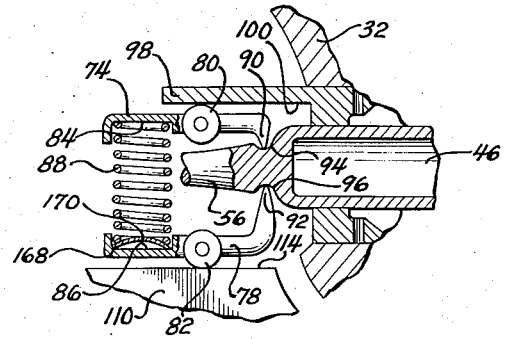
Figure 4 is a fragmentary view illustrating a modification of the invention.

Figure 4 illustrates one modification of the invention which contemplates the use of thermostatic means to overcome any possible adverse effects on the system by large variations in temperature. The force balance system proposed by this invention is based on the principle of a fixed opposing force on a variable lever arm. In most applications where the temperature remains substantially constant or the variation is small, the accuracy of the invention will not, for all practical purposes be diminished.

Generally speaking, the spring rate of a mechanical spring decreases with an increase in temperature since the modulus of elasticity is decreased with an increase in temperature. Since the invention contemplates a constant force, it becomes apparent that when the system is subjected to both high and low temperatures, the force will be diminished at the higher temperatures. One way that this decrease in force can be compensated for is a further deflection of the spring 88 which will create an additional force equal to that lost due to temperature.

The compensating deflection cannot, however, be achieved directly through the movement of member 110 since the member 110 must remain at the designed null point in order to maintain equilibrium in the system; consequently, any departure from this null causes the piston 46 to move either to the left or right.

Figure 5:
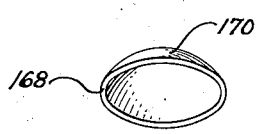
Figure 5 is a perspective view illustrating one of the elements shown in Figure 4.

The modification proposed accomplishes the compensating deflection through the use of a thermostatic element 168 which is inserted between the spring 88 and one of the pads such as 86. The thermostat as illustrated in Figure 5 may be of a generally spherical shape having a spherical surface 170 which engages the spring 88.

Figure 6 illustrates generally the reduction of the spring rate, $Ks$, of spring 88 due to an increase in temperature. Figure 7 illustrates the displacement, $\Delta X$, of spring 88 by the thermostat 168 due to an increase in temperature. And Figure 8 graphically illustrates the resulting constant force, $Fs$, on the lever 110. The force $Fs$ is of course the sum of the residual force $Fo$ at any particular temperature plus the force $F_1$ [equal to $(\Delta X)(Ks)$] derived from the effect of thermostat 168.

Although but two embodiments of the invention have been disclosed, it is apparent that other modifications of the invention are possible within the scope of the appended claims.

What we claim is:

1. In a closed loop moment balance system, pressure responsive means adapted to be influenced by at least two distinct fluid pressures, a pivotally supported moment arm, means connected to said pressure responsive means for resiliently creating and sequentially applying an artificial reference force at various points along said moment arm, valve means secured to the free end of said moment arm for varying the magnitude of at least one of said distinct fluid pressures, and means for directing a force input to said moment arm for actuating said valve means.

2. In a closed loop moment balance system, pressure responsive means adapted to be influenced by at least two distinct fluid pressures, a pivotally supported moment arm, means connected to said pressure responsive means for resiliently creating and sequentially applying an artificial reference force of constant magnitude at various points along said moment arm, valve means secured to the free end of said moment arm for varying the magnitude of at least one of said distinct fluid pressures, and means for directing a force input to said moment arm for actuating said valve means.

3. In a closed loop moment balance system, pressure responsive means adapted to be influenced by at least two distinct fluid pressures, a pivotally supported moment arm, means connected to said pressure responsive means for resiliently creating and sequentially applying an artificial reference force at various points along said moment arm, thermostatic means cooperating with said resiliently created force and adapted to maintain a constant magnitude of said force regardless of variations in temperature, valve means secured to the free end of said moment arm for varying the magnitude of at least one of said distinct fluid pressures, and means for directing a force input to said moment arm for actuating said valve means.

4. In a closed loop moment balance system, two-diameter piston means adapted to be influenced by at least two distinct fluid pressures, a pivotally supported moment arm, spring means adapted to create a force and connected to said two-diameter piston means in a manner so as to be applied at various points along said moment arm, thermostatic means cooperating with said spring means and adapted to increase the deflection of said spring as temperature increases, valve means secured to the free end of said moment arm for varying the magnitude of at least one of said distinct fluid pressures, and means for directing a force input to said moment arm for actuating said valve means.

5. In a mechanical computing device for creating an output movement of a magnitude proportional to the magnitude of the force input, a piston responsive to changes in pressure, lever members pivotally secured to said piston, spring means normally urging said members outwardly away from each other, a restraining member positively limiting the outward movement of one of said lever members, a pivotally-mounted second restraining member yieldingly limiting the outward movement of the other of said lever members, a servo valve connected to said second restraining member for varying the magnitude of at least one of the various pressures influencing said piston, and means for directing a force input to said second restraining member at a distance away from the pivoted mounting thereof.

6. In a mechanical computing device for creating a linear movement of a magnitude proportional to the magnitude of the force input, a two-diameter piston responsive to changes in pressure, a plurality of lever members pivotally secured to said piston, a plurality of rollers secured to said lever members intermediate of the ends of said lever members, spring means mounted between said lever members normally urging said members and rollers outwardly away from each other, a rigid restraining member positively limiting the outward movement of one of said lever members and associated rollers, a pivotally-mounted second restraining member yieldingly limiting the outward movement of the other of said lever members and associated rollers, a servo valve connected to said second restraining member for varying the magnitude of at least one of the various pressures influencing the said two-diameter piston, and means for directing a force input to said second restraining member at a fixed distance away from the pivotal mounting thereof.

7. In a closed-loop error-detecting force balance system, a pivotally mounted moment arm, force input means operatively engaging said moment arm at a fixed distance from said pivotal mounting and adapted to create an error signal tending to rotate said moment arm, pressure responsive means adapted to be influenced by at least two distinct fluid pressures and capable of two directional movement, a resiliently created resisting force operatively connected to said pressure responsive means and adapted to resist the tendency of said moment arm to rotate, valve means connected to said moment arm for varying the magnitude of at least one of said distinct fluid pressures, said pressure responsive means and said resiliently created force being so arranged with respect to each other so as to form a substantially constant resisting force to said moment arm at a variable effective lever arm, said effective lever arm varying in length dependent on the magnitude of said error signal.

8. In a closed-loop error-detecting force balance system, a pivotally mounted moment arm, force input means operatively engaging said moment arm at a fixed distance from said pivotal mounting and adapted to create an error signal tending to rotate said moment arm, pressure responsive means adapted to be influenced by at least two distinct fluid pressures and capable of two directional movement, means connected to said pressure responsive means for resiliently creating a resisting force adapted to resist the tendency of said moment arm to rotate, valve means connected to said moment arm for varying the magnitude of at least one of said distinct fluid pressures, said pressure responsive means and said means resiliently creating a resisting force being so arranged with respect to each other so as to form a substantially constant resisting force to said moment arm at a variable effective lever arm.

9. A closed loop moment balance system, comprising pressure responsive means, conduit means for directing an actuating fluid to said pressure responsive means, a pivotally supported moment arm, means connected to said pressure responsive means for resiliently creating and sequentially applying an artificial reference force at various points along said moment arm, valve means operatively connected to said moment arm for varying the magnitude of the pressure of said actuating fluid, and means for directing a force input to said moment arm for actuating said valve means.

10. A closed loop moment balance system, comprising pressure responsive means, conduit means for directing an actuating fluid to said pressure responsive means, a pivotally supported moment arm, means connected to said pressure responsive means for resiliently creating and sequentially applying an artificial reference force at various points along said moment arm, thermostatic means cooperating with said means for creating said resilient force and adapted to maintain a constant magnitude of said force regardless of variations in temperature, valve means operatively connected to said moment arm for varying the magnitude of the pressure of said actuating fluid, and means for directing a force input to said moment arm for actuating said valve means.

References Cited in the file of this patent

UNITED STATES PATENTS

| | | |
|---|---|---|
| 1,515,173 | Roucka | Nov. 11, 1924 |
| 1,585,529 | Boving | May 18, 1926 |
| 2,220,176 | Rosenberger | Nov. 5, 1940 |
| 2,507,498 | Brown | May 16, 1950 |
| 2,643,055 | Sorteberg | June 23, 1953 |
| 2,790,427 | Carson | Apr. 30, 1957 |

Notice of Adverse Decision in Interference

In Interference No. 92,294 involving Patent No. 2,968,283, E. B. Hilker, W. H. Cowles, G. B. Stroh and R. S. Fleming, FORCE BALANCE SYSTEM, final judgment adverse to the patentees was rendered Dec. 4, 1964, as to claims 1, 2, 3, 4, 7, 8, 9 and 10.

[*Official Gazette May 18, 1965.*]